April 17, 1962 F. J. GERACE 3,029,593

TELEPHONE CLOCK ALARM

Filed Nov. 19, 1957

INVENTOR.

Frank J. Gerace

BY Victor J. Evans & Co.

ATTORNEYS

United States Patent Office 3,029,593
Patented Apr. 17, 1962

3,029,593

TELEPHONE CLOCK ALARM

Frank J. Gerace, 872 Sheridan Ave., Elizabeth, N.J.

Filed Nov. 19, 1957, Ser. No. 697,398
2 Claims. (Cl. 58—16)

This invention relates to a telephone, and more particularly to a telephone which has incorporated therein a clock mechanism.

The object of the invention is to provide a telephone wherein there is incorporated therein a clock such as an electric clock, so that the clapper of the clock can be caused to move at a certain time and wherein the clapper is arranged so that it will engage the bells of the telephone to give a loud signal when desired.

Another object of the invention is to provide a telephone clock arrangement wherein there is proivded a means for actuating the telephone bells from the alarm mechanism of the clock, so that the bells can be sounded at a predetermined time, as for example, the bells can be sounded when the alarm on the clock goes off.

A further object of the invention is to provide a clock and telephone assembly which is extremely simple and inexpensive to manufacture.

Other objects and advantages will be apparent during the course of the following description.

In the accompanying drawings, forming a part of this application, and in which like numerals are used to designate like parts throughout the same.

Figure 1:
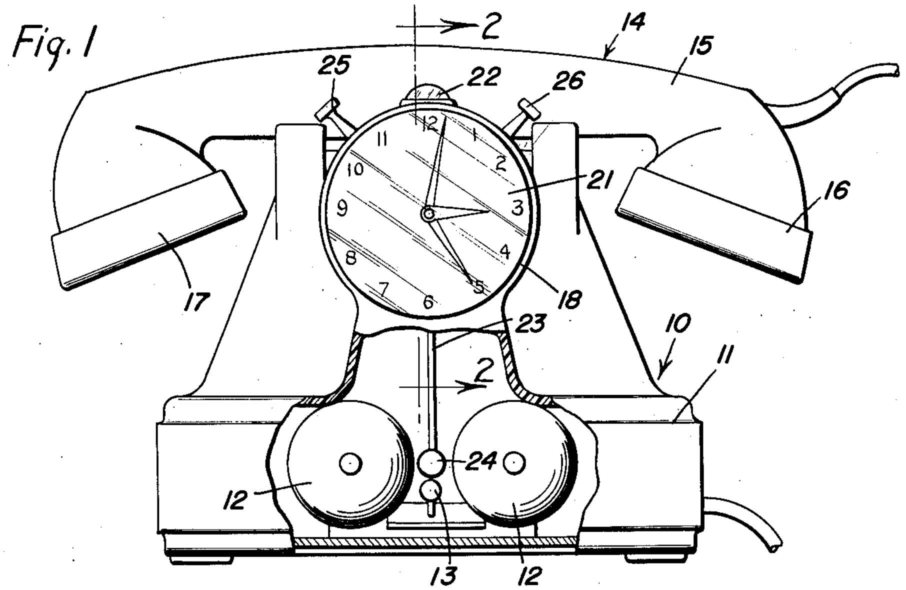
FIGURE 1 is an elevational view showing the clock and telephone assembly of the present invention, and with parts broken away and in section, the telephone shown in FIGURE 1 being of the table top type.
Figure 2:
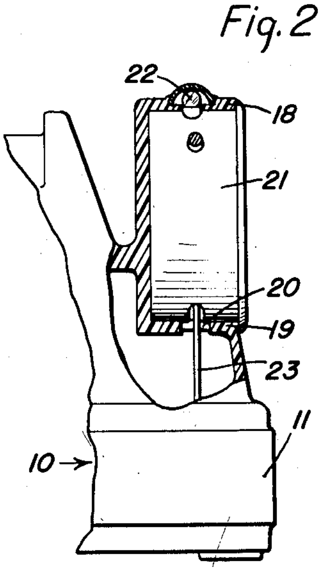
FIGURE 2 is a sectional view taken on the line 2—2 of FIGURE 1.

Referring in detail to the drawings, and more particularly to FIGURES 1 and 2 of the drawings, there is shown a table top type of telephone which is indicated generally by the numeral 10, and the telephone 10 includes a base 11 which has a pair of spaced apart telephone bells 12 therein. The numeral 13 indicates the usual telephone clapper or sounding member, and the numeral 14 designates a hand piece which comprises a handle 15 that has the usual transmitter 16 and receiver 17.

Formed integral with the base 11 of the telephone or secured thereto is a casing 18, and the casing 18 includes a lower wall portion 19 which is provided with a slot or cut out 20, FIGURE 2.

Mounted in the casing 18 is an alarm clock 21, and arranged adjacent the top of the clock 21 is a light bulb 22. The numeral 23 indicates a movable bar which is connected to the clock 21, and the clapper 24 is arranged on the lower end of the bar 23, and the clapper 24 is adapted to engage the telephone bells 12 for providing an audible sound when the clock 21 has its alarm mechanism actuated.

The clock 21 is further provided with conventional alarm setting and clock setting arms 25 and 26, FIGURE 1.

Figure 3:
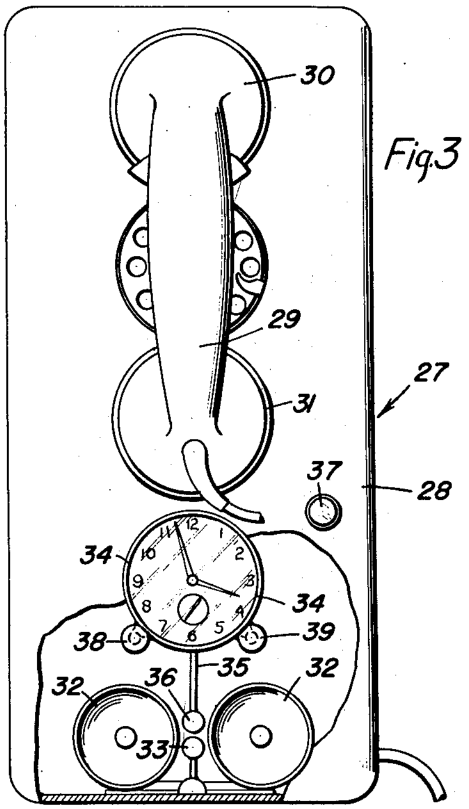
FIGURE 3 is an elevation illustrating a modified type of telephone which is of the wall type, and with parts broken away and in section.

Referring now to FIGURE 3 of the drawings, there is shown a modification wherein the numeral 27 indicates a wall type of telephone which includes the hollow housing 28 and the numeral 29 indicates a hand piece which includes a receiver 30 and transmitter 31 on the ends thereof. As shown in FIGURE 3, the numeral 32 indicates each of a pair of telephone bells and there is provided a telephone clapper 33 for actuating the bells 32. The device of FIGURE 3 further includes an alarm clock

34 that has a bar 35 depending therefrom, and the movable bar 35 is provided with a clapper 36 for engagement with the bells 32. The numeral 37 indicates a night light, and the numerals 38 and 39 indicate alarm setting and clock setting arms.

From the foregoing, it is apparent that there has been provided a combined clock and telephone and wherein the usual telephone bells such as the bells 12 or 32 are adapted to be actuated by a clapper which is operated by an alarm clock. In FIGURES 1 and 2 the device is illustrated on a table top telephone 10, and it will be seen that the clock 21 can be arranged in a casing 18 adjacent the base 11, and the casing 18 has a bottom wall 19 which is cut out as at 20 so that the movable bar 23 from the clock 21 can be caused to actuate the bar 23 which in turn will cause the clapper 24 to strike the bells 12 with rapidity so that these bells 12 can be actuated when the alarm clock 21 goes off. The clock 21 can be set to go off by means of the arm 25 which is of conventional construction. It is to be noted that the conventional bells 12 in the telephone base 11 are utilized or struck by the clapper 24 of the alarm clock.

In FIGURE 3 the present invention is shown being used on a wall type phone 27, and again the conventional telephone bells 32 are actuated by a clapper 36 which is moved by the alarm clock 34. In FIGURE 3 when the telephone rings, the clapper 33 can be used for striking the bells 32. Similarly, in FIGURE 1 when the telephone rings, the clapper 13 will strike the bells 12.

Thus, it will be seen that according to the present invention an electric clock is integrally or securely attached to the telephone and the alarm mechanism of the clock uses the bells within the telephone instrument and this insures that a louder sound will be made than is possible with the usual alarm clock. The light such as the light 22 or 37 serves as a useful night light for the telephone as well as the clock itself. The tone can be controlled by the usual attachment on the telephone. The clock casing can be made of a tough plastic which has an unbreakable glass thereon, and the clock can be operated by the electric current in the phone and the unit constructed according to the present invention is especially suitable for awakening heavy sleepers. Furthermore, the device is especially useful in hotels since it will eliminate the necessity of calling guests, and it will also make it unnecessary for guests to leave watches out so as to prevent pilferage or theft. The base of the clock can be molded to fit the contour of the phone.

The parts can be made of any suitable material and in different shapes or sizes.

The above description of the invention is for illustrative purposes only and it is understood that modifications may be made in the construction within the scope and spirit of the following claims.

I claim:

1. A device of the character described comprising a telephone embodying spaced apart bells, a sounding member for ringing said bells upon proper actuation of the telephone, and a clock connected to said telephone and said clock including an alarm mechanism having a clapper connected thereto for selectively engaging said bells, said clapper and sounding member being contiguous to each other but being spaced from each other so that the bells can be rung by actuation of the sounding member when the telephone is properly actuated, or else the bells can be rung by actuation from the clapper when the alarm mechanism of the clock is properly actuated.

2. In a telephone of the type that includes a base, a pair of spaced apart bells mounted in said base, and a sounding member mounted for selective movement into and out of engagement with said bells, the improvement consisting in providing a casing that is integral with said base and said casing including a lower wall portion that has a slot therein, a movable bar projecting through said slot, a clock arranged in said casing and said clock including an alarm mechanism that is operatively connected to the upper end of said bar, and a clapper on the lower end portion of said bar and said clapper adapted to selectively engage said bells, said clapper being spaced from said sounding member and being independent from said sounding member, so that the pair of bells can either be rung when engaged by the sounding member as the result of the telephone being actuated by an incoming phone call, or else the bells can be rung by engagement thereof from the clapper when the clock alarm mechanism is actuated.

References Cited in the file of this patent

UNITED STATES PATENTS

| | | |
|---|---|---|
| 214,129 | Hart | Apr. 8, 1879 |
| 538,306 | Westerfield | Apr. 30, 1895 |
| 1,999,948 | Stephenson | Apr. 30, 1935 |
| 2,020,016 | Brusseau | Nov. 5, 1935 |
| 2,032,414 | Helbein | Mar. 3, 1936 |
| 2,115,280 | Perlman | Apr. 26, 1938 |
| 2,210,337 | Perlman | Aug. 6, 1940 |

FOREIGN PATENTS

| | | |
|---|---|---|
| 180,707 | Germany | Jan. 25, 1907 |